United States Patent [19]
Dekkers et al.

[11] Patent Number: 5,208,287

[45] Date of Patent: May 4, 1993

[54] THERMOPLASTIC ELASTOMERS AND METHOD FOR MAKING

[75] Inventors: Marijn E. J. Dekkers; Andra J. Moffett, both of Schenectady, N.Y.

[73] Assignee: General Electric Company, Schenectady, N.Y.

[21] Appl. No.: 686,446

[22] Filed: Apr. 17, 1991

Related U.S. Application Data

[63] Continuation-in-part of Ser. No. 540,031, Jun. 18, 1990, abandoned.

[51] Int. Cl.$^5$ .............. C08L 51/06; C08L 67/02
[52] U.S. Cl. .................................. 525/64; 525/68
[58] Field of Search .............................. 525/64, 68

[56] References Cited

FOREIGN PATENT DOCUMENTS 309800 10/1987 European Pat. Off. .

*Primary Examiner*—Patricia A. Short
*Attorney, Agent, or Firm*—William A. Teoli; William H. Pittman

[57] ABSTRACT

Melt blends of thermoplastic aromatic polyester, such as polybutylene terethphalate, with epoxy functionalized EPDM rubber or orthoester functionalized EPDM rubber and an effective amount of a crosslinking agent, such as a free radical initiator, have been found to provide thermoplastic elastomers having an elastic recovery % of at least 70.

13 Claims, No Drawings

THERMOPLASTIC ELASTOMERS AND METHOD FOR MAKING

REFERENCE TO RELATED APPLICATION

This application is a continuation-in-part of copending application Ser. No. 07/540,031, filed 6/18/90, now abandoned. Reference also is made to copending application Ser. No. 686,447 filed concurrently herewith which is a continuation in part of Ser. No. 07/539,939, now abandoned, and Ser. No. 07/645,177 filed 1/24/91, now abandoned, which are incorporated herein by reference.

BACKGROUND OF THE INVENTION

The present invention relates to thermoplastic elastomers resulting from the dynamic vulcanization of a compatibilized blend of an aromatic polyester and an epoxy or ortho ester functionalized EPDM rubber. More particularly, the present invention relates to products obtained by the melt extrusion of blends having an effective amount of a free radical initiator, and a compatibilized blend of an epoxy or ortho ester functionalized ethylene-propylene-polyene terpolymer (EPDM rubber) and and aromatic polyester, such as polybutylene terephthalate (PBT).

Prior to the present invention, thermoplastic elastomers were developed to provide materials which could be processed as thermoplastics and yet have the ability to retract forcibly from a large deformation. A term often associated with thermoplastic elastomer is "dynamic vulcanization" which is described by A. Y. Coran et al, Rubber-Thermoplastic Compositions, Rubber Chem Technology 55 (1982) 116. More details about dynamic vulcanization is shown by Coran, in Thermoplastic Elastomers, A Comprehensive Review, edited by R. N. Legge et al on pages 135–156, MacMillan Publishing Company, New York, 1987. In dynamic vulcanization, an elastomer, such as an EPDM rubber, i.e. an ethylene-propylene-diene monomer rubber is vulcanized during its melt-mixing with molten plastic. Although dynamic vulcanization can provide compositions which are very elastomeric in their performance characteristics, it has been found that when the EPDM rubber is dynamically vulcanized during melt mixing with a thermoplastic material, it is often difficult to produce a finely dispersed blend of EPDM and the thermoplastic material at the desired blend ratios of interest. Improved compatibility between thermoplastic resins, such as, PBT and EPDM rubbers has been achieved by modifying the EPDM rubbers with an ester of an $\alpha,\beta$-unsaturated acid having an epoxide functional group on the alkoxy portion, such as, glycidyl methacrylate, as shown by European patent application 0,274,744 or by modifying the EPDM rubber with an ortho ester as shown in copending application Ser. No. 07/645,177. Additional uses of EPDM rubbers modified with an epoxy functional ester of an $\alpha,\beta$-unsaturated acid are as impact modifiers for aromatic polyesters, as shown by European patent 0,309,800.

Although the proportions of the EPDM rubber and plastic components have been found to have an effect on physical properties, such as tensile strength (psi) and elongation at break (%) it would be desirable to obtain elastomeric thermoplastic compositions having reduced Tensile set (%) as defined hereinafter, or correspondingly enhanced elastic recovery % as well as valuable physical properties, such as tensile strength (psi) and elongation at break (%) resulting from the melt blending of mixtures of aromatic thermoplastic polyesters and EPDM rubbers.

SUMMARY OF THE INVENTION

The present invention is based on the discovery that dynamically vulcanized thermoplastic elastomers based on the cure of aromatic thermoplastic polyesters, such as PBT, and EPDM rubbers modified with epoxide functional groups or ortho esters as defined above, can be made by melt extruding certain blends of PBT and the aforementioned functionalized EPDM rubber, followed by melt extruding a mixture of the functionalized EPDM and PBT. In instances where the EPDM rubber has been functionalized with epoxy groups, an epoxy reactive vulcanizing agent, such as an organodiamine can be used.

The resulting vulcanized compatibilized blends of epoxy or ortho ester functionalized EPDM rubber and aromatic thermoplastic polyesters have been found to have enhanced physical properties including an enhanced elastic recovery %.

As used hereinafter the term "elastic recovery %" means the value in % obtained by subtracting the Tensile set % from 100. The tensile set % is measured on ASTM D638, type I, large tensile bars pulled on a screw driven Instron testing machine at room temperature.

The tensile set % can be determined by pulling large ASTM D638 tensile specimens 2.5 inches at a crosshead speed of 20in/min. and holding the sample at this strain for 10 minutes. The specimens are then removed from the Instron testing machine and put into an oven where they are kept for 45 minutes at 115° C. After the specimens are taken out of the oven they are allowed to cool for 10 minutes before the tensile set is determined using the formula:

$$\% \text{ Tensile set} = \frac{L_{after} - L_{original}}{L_{before} - L_{original}} \times 100$$

where $L_{original}$ is the original length between gauge marks on the specimen (in this case 2.5 inches)

$L_{before}$ is the length between the gauge marks when the specimen is in the grips and pulled to full (100 or 200%) extension.

$L_{after}$ is the length between the gauge marks after the specimen has been taken out of the oven and allowed to cool for 10 minutes.

STATEMENT OF THE INVENTION

There is provided by the present invention, a thermoplastic elastomer having an elastic recovery of at least 70%, which thermoplastic elastomer is the product obtained by melt extruding a blend comprising by weight, (A) an effective amount of a curing agent and
(B) a melt extruded mixture comprising,
(i) from about 45% to 70% by weight of an EPDM rubber functionalized with from about 0.1 to about 16 epoxy groups or 0.1 to 16 ortho ester groups per 1000 carbon atoms, and having from 0.1 to 20 percent by weight of epoxy or 0.1 to 20% by weight of ortho ester containing grafting material grafted on the EPDM rubber and, (ii) from about 55% to about 30% by weight of aromatic thermoplastic polyester,
where the curing agent of (A) is a member selected from a free radical initiator or a crosslinking agent selected from the class consisting of organic polyamines, organic polyacids, organic polyesters, organic polyanhydrides, organic polysulfides and precursors thereof.

EPDM rubbers which can be used in the practice of the present invention can be made by a well known procedure, as fully described in patents such as, U.S. Pat. Nos. 2,933,480, 3,093,621, 3,211,709, 3,646,168, 3,790,519, 3,884,993, 3,894,999 and 4,059,654 which are incorporated herein by reference. A typical procedure for making the EPDM rubber is by reacting varying amounts of ethylene, propylene and a polyene monomer containing a plurality of carbon to carbon double bonds which is carried out in the presence of a catalyst and a solvent medium. The polyene monomer which is used as a third component in making the EPDM terpolymer, in addition to the ethylene and propylene to form a terpolymer of ethylene, mono-olefin, preferably propylene, and a polyene, include such polyene monomers as, open chained poly unsaturated hydrocarbons containing 4–20 carbon atoms, such as, 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1) heptane, wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes, wherein the alkenyl group contains about 3–20 carbon atoms and preferably 3–10 carbon atoms. Other bridged ring hydrocarbons include polyunsaturated derivatives of bicyclo(2,2,2)octane as represented by bicyclo(3,2,1)octane polyunsaturated derivatives of bicyclo(3,3,1)nonane and polyunsaturated derivatives of bicyclo(3,2,2)nonane.

Specific examples of preferred bridged ring compounds include 5-methyldene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadienes, the methyl butenyl norbonenes such as 5-(2-methyl-2-butenyl)-2-norbornene or 5-(3-methyl-2-butenyl)-norbornene, and 5-(3-dimethyl-4-hexenyl)-2-norbornene. The elastomer prepared from 5-ethylidene-2-norbornene is preferred.

The EPDM backbone rubber may contain chemically bound molar ratios of ethylene to propylene or other

mono-olefins, varying between 95 to 10, and 5 to 90 ethylene to propylene, and preferably between 70 to 30 and 55 to 45 ethylene to propylene. The polyene or substituted polyene may be chemically bound therein in an amount of 9.1 to 10 mol percent, and preferably 0.3 to 1 mol percent. The level of unsaturation in the backbone rubber may range from 0–20 double bonds, per 1,000 carbon atoms in the polymer chain.

The polymerization reaction for preparation of the EPDM is carried out in the presence of a catalyst in a solvent medium. The polymerization solvent may be any suitable inert organic solvent that is liquid under reaction conditions. Examples of satisfactory hydrocarbon solvents are straight-chain paraffins having from 5–8 carbon atoms with best results often being secured by the use of hexane, aromatic hydrocarbons and preferably an aromatic hydrocarbon having a single benzene nucleus, such as benzene, toluene and the like and saturated cyclic hydrocarbons having boiling point ranges approximately those of the straight chain paraffin hydrocarbons and aromatic hydrocarbons described above and preferably saturated cyclic hydrocarbons having 5–6 carbon atoms in the ring nucleus. The solvent selected can be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler-type catalyst used in the polymerization reaction.

The interpolymerization is carried out in the presence of a Ziegler catalyst of the type well known to the prior art. Such Ziegler-type catalysts are disclosed in a large number of patents, such as U.S. Pat. Nos.. 2,933,480, 3,093,620, 3,093,621, 3,211,709 and U.S. Pat. No. 3,113,115. Examples of Ziegler catalysts include metal organic coordination catalysts prepared by contacting a compound of a heavy metal of the group IV-a, V-a, VI-a and VII-a of the Mendeleev periodic system of elements, such as titanium, vanadium and chromium halides with an organo-metallic compound of a metal of groups I, II or II of the Mendeleev periodic system which contains at least one carbon-metal bond, such as trialkyl aluminum and alkyl aluminum halides in which the alkyl groups contain from 1–20 and preferably 1–4 carbon atoms.

The preferred Ziegler catalyst is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, having the general formula R-AlCl and R$_2$AlCl and the corresponding sesquichlorides of the general formula R$_3$Al$_2$Cl$_3$ in which R is methyl, ethyl, propyl, butyl or isobutyl in the catalyst system, the aluminum to vanadium mol ratio of the aluminum and vanadium compounds may be within the range of 5:1 to 200:1 and preferably within the range of 15:1 to 60:1 with best results being secured in the ratio of 40 aluminum to 1 vanadium. These same ratios apply with respect to corresponding compounds of others of the heavy metals substituted for the vanadium compound and the organo-metallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride, per 5–300 moles of aluminum and more preferably 15–60 moles of aluminum with 40 moles of aluminum per mole of vanadium yielding the best results.

The polymerization is preferably carried out on a continuous basis in a reaction vessel closed to the outside atmosphere which is provided with an agitator cooling means and conduit means for continuously supplying the ingredients of the reaction including monomer catalyst and accelerators and conduit means of continuously withdrawing solution containing elastomer, and the catalyst is killed by the addition of a catalyst deactivator.

In the practice of one form of the invention, thermoplastic elastomers having optimum elastic recovery, can be obtained by modifying the EPDM rubber with an epoxy compound, such as glycidyl methacrylate. However, any epoxy compound included within the formula,

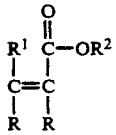

can be used, where R and $R^1$ are the same or different monovalent radicals selected from the class consisting of hydrogen, methyl, ethyl, propyl or $C_{(4-8)}$ alkyl, aralkyl, cyclic or a $C_{(6-13)}$ aromatic organic group and $R^2$ is an organic group having an epoxide functionality. Suitable epoxy functional graft monomers are glycidyl ethers of unsaturated alcohols, i.e., allyl-glycidyl ether, methallylglycidyl ether; glycidyl esters of unsaturated carboxylic acids; i,e., glycidyl-2-ethyl acrylate, glycidyl-2-propyl, acrylate glycidyl; acrylate, glycidyl ethers of alkenylphenols, i.e., isopropenylphenyl-glycidyl ethers; vinyl and allyl esters of epoxy carboxylic acids, vinyl esters of epoxidized oleic acid; and the like. Preferred as the graft monomer herein is glycidyl methacrylate (GMA). Modification of the EPDM rubber with the epoxy functional monomer is preferably achieved by premixing the epoxy monomer with a free radical initiator and thereafter blending the resulting mixture with the EPDM rubber. The resulting blend can be extruded at a temperature of about 100° C. to about 350° C. In the grafting reaction, there can be used 0.1 to 20 parts of the epoxy compound and preferably 2 to 10 per 100 parts by weight of the EPDM rubber.

If desired, the grafting reaction also can be carried out in a solvent solution with the unsaturated EPDM rubber present at a concentration which can range from about 10 to 30% by weight. Suitable organic solvents are for example, $C_{(5-10)}$ aliphatic hydrocarbons, such as hexane, heptane and octane.

The reaction can be conducted with constant stirring at an elevated temperature within the range of 125-200° C., and the time ranging from 1/2 to 2 hours. Preferably, the functionalization of the EPDM with the epoxy compound is achieved under melt conditions in the presence of a radical initiator such as, 2,5-dimethyl-2,5-bis(t-butylperoxy)hexane.

Alternatively, the EPDM rubbers can be modified with ortho esters as shown by the following formula:

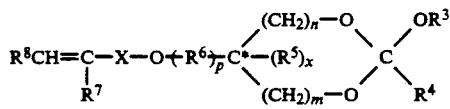

wherein:
$R^3$ is $C_{1-10}$ primary or secondary alkyl or aralkyl or a $C_{6-10}$ aromatic radical or is an alkylene radical forming a second 5- or 6-membered ring with $C^*$, and $R^4$ is $C_{(1-10)}$ primary or secondary alkyl or aralkyl or a $C_{(6-10)}$ aromatic radical, or $R^3$ or $R^4$ together with the atoms connecting them form a 5-, 6 or 7-membered ring;
$R^5$ is hydrogen or $C_{1-4}$ primary or secondary alkyl;
$R^6$ is an unsubstituted or substituted $C_{1-6}$ alkylene or $C_{6-10}$ arylene radical;
$R_7$ is hydrogen or methyl;
$R_8$ is hydrogen, $C_{1-6}$ alkyl or $C_{6-10}$ aromatic radical;
X is a substantially inert linking group;
m is 0 or 1;
n is from about 1 to 2-m; and
p is 0 or 1.
x is 0 when $R^3$ and $C^*$ form a ring and is otherwise 1

One aspect of the invention is the presence of a cyclic ortho ester moiety. The $R^3$ value therein may be a $C_{1-10}$ primary or secondary alkyl radicals, such as methyl, ethyl, n-propyl, isopropyl, n-butyl, isobutyl, secondary butyl, n-hexyl, isooctyl or n-decyl, or a corresponding aralkyl radical. Most often, it is $C_{1-4}$ alkyl. Primary radicals and especially the methyl radical are generally preferred.

The $R^4$ value may be a $C_{1-4}$ primary or secondary alkyl radical as defined above for $R^3$, or a $C^{6-10}$ unsubstituted or substituted aromatic (preferably aromatic hydrocarbon) radical. Any substituents should be nonreactive under the conditions of the invention; examples are halo, nitro and alkoxy.

The $R^5$ and $R^7$ radicals are selected from hydrogen or an alkyl radical similar to $R^3$ and $R^4$ and preferably hydrogen.

The $R^6$ radical is an unsubstituted or substituted $C_{1-6}$ alkylene radical, any substituents being inert to ortho ester formation and reaction with aryl chlorides; e.g., alkoxy. Preferably, $R^6$ is methylene.

The $R^8$ radical may be hydrogen, alkyl or aryl as previously defined. It is preferably hydrogen.

The polyesters suitable for use herein may be any of the linear or branched saturated polyesters known to those skilled in the art. Generally, the polyesters will comprise linear saturated polyesters derived from alkylene glycols such as ethylene glycol, propylene glycol, 1,4-butanediol, etc. including cycloaliphatic glycols, such as 1,4-cyclohexanedimethanol and mixtures of any of these glycols with one or more aromatic dicarboxylic acids. Preferably, the polyesters can comprise polyalkyene terephthalates prepared by known techniques, such as the transesterification of esters of terephthalic acid alone or mixtures of esters of terephthalic acid and isophthalic acid with a glycol or a mixture of glycols and subsequent polymerization by heating the glycols and the free acids or halide derivatives thereof. Suitable methods are described in U.S. Pat. No. 2,465,319 and No. 3,045,539 incorporated herein by reference. In addition, blends of one or more of these polyesters or copolyesters may be employed. A suitable poly(1,4-butylene terephthalate) resin is commercially available from General Electric Company under the trade designation VALOX ® 315 and poly(ethylene terephthalate) resins are well known and available commercially.

The epoxy functionalized or ortho ester functionalized EPDM rubber can be melt compounded with the polyester resin to prepare a compatibilized polyester resin-epoxy functionalized or ortho ester functionalized EPDM rubber blend. Blending of the functionalized EPDM rubber and the polyester resin can be conducted under neat conditions in an extruder at temperatures in the range of from 150° C. to 350° C. and preferably 230° C-315° C.

The blend of the functionalized EPDM and polyester which has been compatibilized by melt extrusion, can be dynamically vulcanized by utilizing an effective amount of a curing or crosslinking agent with the compatibilized blend. The crosslinking reaction is caused to take place through reaction of the crosslinking agent with either residual unsaturation, or residual epoxy groups of the rubber phase.

An effective amount of the curing or cross-linking agent is about 0.1% to 5% by weight of curing agent and preferably 0.5% to 1.5% by weight of curing agent based on the weight of EPDM rubber prior to dynamic vulcanization. Suitable curing or cross-linking agents are for example, cross-linking agents that react with residual unsaturation such as peroxides, sulphur and polysulphides, cross-linking agents that react with the residual epoxy groups such as organic diamines or polyamines, organic diacids or polyacids, organic diesters or polyesters, organic dianhydrides or polyanhydrides and other polyfunctional epoxide reactive compounds. More specific examples are hexamethylene diamine, hexamethylene diamine carbamate, benzophenone tetracarboxylic dianhydride, adipic acid and maleic acid or anhydride and their precursors.

Vulcanization of the EPDM rubber and polyester, can be achieved by blending of the curing or crosslinking agent with the compatibilized mixture of the polyester resin and the functionalized EPDM rubber. The compatibilized blend and an effective amount of the curing agent can be extruded at temperatures at a range of from 150° C. to 350° C. to effect vulcanization.

In order that those skilled in the art will be better able to practice the present invention the following examples are given by way of illustration and not by way of limitation. All parts are by weight.

EXAMPLE 1

Glycidyl methacrylate (GMA) functionalized EPDM rubber was prepared utilizing a blend of the GMA with 2,5-dimethyl-2,5-bis(t-butylperoxy)hexane(-Lupersol 101) as the radical initiator. There was used 3.3 parts of the blend having a 10/1 ratio of GMA and the radical initiator which was premixed with 100 parts by weight EPSYN®E901 pellets, an EPDM rubber having about 83 mole % of ethylene units in addition to chemically combined propylene units and norbornene units. This EPDM rubber had about 5.4 mol % of

unsaturation and is manufactured by the Copolymer Rubber and Chemical Corporation of Baton Rouge, LA. A premixture was prepared by tumbling the ingredients for 10 minutes. The premixture was then allowed to refrigerate for 16 hours before it was extruded at 205° C. on a Welding Engineers 20 mm twin screw extruder. The resulting GMA functionalized EPDM had about 0.1 to 2 epoxy groups per 1000 carbon atoms. It was pelletized and dried at 70° C. for 4 hours.

Equal parts of the GMA functionalized EPDM and polybutylene terephthalate (PBT) pellets (Valox ® 315 of the GE Company) were extruded on a Welding Engineers 20 mm twin screw extruder at 250° C. The resulting blend was pelletized and dried for 4 hours at 125° C.

A premixture of 0.5 part of 2,5-dimethyl-2,5-bis(t-butylperoxy)hexyne-3(Lupersol 130) and 100 parts of the above compatibilized PBT/EPDM blend was tumbled for 10 minutes. The resulting premixture was allowed to refrigerate for 16 hours before it was extruded at 250oC on a Welding Engineers 20 mm twin screw extruder. The extruded blend was then pelletized and dried for 4 hours at 120° C. Additional extruded blends of PBT and EPDM were prepared following the same procedure except that in some instances, the EPDM was not functionalized with GMA, or a vulcanizing agent was not used in the final extrusion of the PBT/EPDM blend. The various blends were molded into test specimens on an Engel 28 ton injection molding machine at 260° C. The tensile properties of the molded test specimens were measured by testing large ASTM D638 tensile specimens on a screw-driven Instron testing machine at a cross-head speed at 2in/min. The elastic recovery was calculated by initially determining the tensile set (%) which was then subtracted from 100%.

The physical properties of the various test specimens were then evaluated and the following results were obtained, where compositions are shown in parts by weight.

| Composition | I | II | III | IV |
| --- | --- | --- | --- | --- |
| PBT | 50 | 50 | 50 | 50 |
| EPDM | — | 50 | — | 50 |
| GMA functionalized EPDM | 50 | — | 50 | — |
| Vulcanized with Lupersol 130 (%) | 0.5 | 0.5 | 0 | 0 |
| Young's modulus (kpsi) | 40 | 38 | 43 | 49 |
| Tensile Strength (psi) | 3300 | 2450 | 3010 | 2230 |
| Elongation at break (%) | 285 | 110 | 285 | 55 |
| Tensile set (%) | 20 | — | 37 | — |
| Elastic recovery (%) | 80 | — | 63 | — |

The above results show that the dynamic vulcanization of the blends of GMA functionalized EPDM and PBT made in accordance with the practice of the present invention substantially enhance the tensile strength (psi) and elongation at break, while reducing the tensile set %, or correspondingly enhancing the elastic recovery %. Tensile set (%) and elastic recovery (%) values were not available for test specimens II and IV as the samples were too brittle to test.

The above procedure was repeated except that 0.5 part of Lupersol 130 was added directly to a mixture of 50 parts of GMA functionalized EPDM and 50 parts of PBT. The resulting mixture was then extruded at 250° C. A test specimen showed a Young's Modulus (kpsi) of 49, tensile strength (psi) of 2650, and an elongation at break (%) of 60. These results were significantly inferior to the physicals shown for blend I above, although the overall ingredients used in making the blends were the same. This shows that the Lupersol 130 must be added to a compatibilized blend of PBT and GMA functionalized EPDM. Dynamic vulcanization can be obtained by melt extruding such mixture.

An effort also was made to prepare a dynamically vulcanized test specimen by adding one part by weight of Lupersol 130 with a premixture of EPDM, GMA and Lupersol 101 in place of GMA functionalized EPDM. It was intended to use 50 parts of the attempted combination after it had been extruded with 50 parts of PBT. However, it was found that the extruded strand of the EPDM, GMA, Lupersol 101 and Lupersol 130 mixture had extremely poor integrity and therefore could not be collected and blended with the PBT.

EXAMPLE 2

An equal part blend of polybutylene terephthalate and EPDM functionalized with 6.6% of a mixture having a 10/1 weight ratio of GMA to peroxide was prepared in accordance with the procedure of Example 1. However, in place of the 0.5% by weight of the blend of Lupersol 130, there was used, 0.75% by weight of the blend of Diak No. 1 ®, an organic diamine precursor, namely, hexamethylene diamine carbamate of E.I. Dupont de Nemours Company. The resulting mixture was then extruded at 250° C. in accordance with the procedure of Example 1. The blend was molded into test specimens following the procedure of Example 1, and evaluated for tension set % and physical properties. The resulting vulcanized thermoplastic elastomer showed a Young's modulus (kpsi) of 30, a tensile strength (psi) of 2520, and elongation at break (%) of 240 and a tensile set (%) of 22 which corresponded to an elastic recovery of 78%.

EXAMPLE 3

A mixture of an ethylenically unsaturated ortho ester and 1 gram of 2,5-dimethyl-2,5-di(t-butylperoxy)hexane was premixed and combined with 1 kilogram of a commercially available EPDM copolymer containing about 83 mole percent ethylene and about 5.4 mole percent norbornene units. The ethylenically unsaturated ortho ester was prepared as follows:

A 5-liter 3-necked flask fitted with a mechanical stirrer, pressure equalizing addition funnel and nitrogen inlet was charged with 301 grams (2.03 moles) of 4-hydroxymethyl-2-methoxy-2-methyl-1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture was stirred at room temperature overnight and the filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm to the residue which was then distilled under vacuum. The desired 4-acryloyloxymethyl-2-methoxy-2-methyl-1,3-dioxolane distilled at 80–85 ° C./0.5–1.0 torr.

Blends of the ortho ester EPDM copolymer and peroxide were stored for about 16 hours at 20° C. to enable the ortho ester and polymerization initiator to be completely absorbed by the EPDM pellets. The blends were then extruded on a twin-screw extruder with zone set temperatures ranging from 120° to 205° C. The extrudates were cooled in a water bath, pelletized and dried in vacuum.

The proportion of the ethylenically unsaturated ortho ester grafted on the EPDM copolymer was determined by dissolving a sample of the graft copolymer in xylene at about 130° C., pouring the resulting solution into acetone and filtering and drying the purified copolymer, which was then analyzed by Fourier transform infrared spectroscopy. Gel content was determined by continuous extraction with hot xylene for 48 hours followed by drying and weighing of the insoluble residue. The results are given in below, with all percentages being by weight.

| | | |
|---|---|---|
| Ortho ester percent based on EPDM copolymer | 0.3 | 1.0 |
| Amount grafted, % | >90 | >90 |
| Gel, % | 0 | 40 |

Dry blends consisting of the ortho ester-grafted EPDM copolymers and poly(butylene terephthalate) were prepared and extruded with and without 0.5% by weight Lupersol 130, a peroxide of the Atocnem Company at temperatures in the range of 250° C. The extrudates were pelletized, dried and molded into test specimens which were tested for tensile strength and elongation (ASTM procedure D638) and notched Izod impact strength (ASTM procedure D256).

The following results were obtained with the acrylate ortho ester "AOE" composition:

| | | PBT/EPDM Blends (1:1) | | | | |
|---|---|---|---|---|---|---|
| | | Before Vulcanization | | | After Vulcanization*** | |
| Composition | % Gel** | TS (psi) | E (%) | T'S (%) | E (%) | TS (%) |
| AOE (0.3%)* | 0 | 2450 | 240 | 37 | 190 | 17 |
| AOE (1%)* | 40 | 3510 | 370 | 20 | 300 | 18 |

*EPDM functionalized with acrylate-orthoester with % functionality described the weight % grafted.
**% Gel was measured by xylene extraction of the functionalized EPDM prior to extrusion with PBT.
***Vulcanization was affected by re-extrusion of the blend with 0.5% Lupersol 130.

Although the above examples are directed to only a few of the very many variables which can be used in the practice of the method of the present invention, as well as the thermoplastic elastomer made therefrom, it should be understood that the present invention is directed to the use of a much broader variety of EPDM rubbers, thermoplastic polyesters, epoxy acrylate functionalizing agents and orthoester functionalizing agents and curing agents as set forth in a description preceding these examples.

What is claimed is:

1. A thermoplastic elastomer having an elastic recovery % of at least 70, which is the product obtained by melt extruding a blend comprising by weight,
    (A) an effective amount of a curing agent and
    (B) a melt extruded mixture comprising,
        (i) from about 45% to 70% by weight of an EPDM rubber functionalized with from about 0.1 to about 16 epoxy groups or 0.1 to 16 ortho ester groups per 1000 carbon atoms, and having from 0.1 to 20 percent by weight of epoxy or 0.1 to 20% by weight of ortho ester containing grafting material grafted on the EPDM rubber and,
        (ii) from about 55% to about 30% by weight of aromatic thermoplastic polyester,
    where the curing agent of (A) is a member selected from a free radical initiator or a crosslinking agent selected from the class consisting of organic polyamines, organic polyacids, organic polyesters, organic polyanhydrides, organic polysulfides and precursors thereof.

2. A thermoplastic elastomer in accordance with claim 1, where the curing agent is a free radical initiator.

3. A thermoplastic elastomer in accordance with claim 1, where the curing agent is an organic diamine.

4. A thermoplastic elastomer in accordance with claim 1, where the EPDM rubber is a terpolymer of ethylenepropylene and norbornene.

5. A thermoplastic elastomer in accordance with claim 1, where the aromatic thermoplastic polyester is polybutylene terephthalate.

6. A thermoplastic elastomer in accordance with claim 1 where the EPDM rubber is functionalized with epoxy groups.

7. A thermoplastic elastomer in accordance with claim 1 where the EPDM rubber is functionalized with ortho ester groups.

8. A method for making a thermoplastic elastomer which comprises,
   (1) adding an effective amount of a curing agent to a compatibilized blend of about 30% to 50% by weight of an aromatic polyester and about 45% to 70% by weight of an epoxy functionalized, or orthoester functionalized EPDM rubber, and
   (2) melt extruding the resulting mixture of (1), where the curing agent is a member selected from the class consisting of a free radical initiator and a crosslinnking agent selected from the class consisting of an organic diamine, an organic diacid, an organic diester, an organic dianhydride, an organic polysulfide and precursors thereof.

9. A method in accordance with claim 8, where the aromatic polyester is polybutylene terephthalate.

10. A method in accordance with claim 8, where the epoxy functionalized EPDM rubber is a glycidyl methacrylate functionalized EPDM rubber.

11. A method in accordance with claim 8, where the curing agent is a free radical initiator.

12. A method in accordance with claim 8, where the curing agent is an organic diamine precursor.

13. A method in accordance with claim 8, where the ortho ester functionalized EPDM rubber is an acrylate ortho ester.

* * * * *